United States Patent
Zhu et al.

(10) Patent No.: US 11,210,706 B2
(45) Date of Patent: Dec. 28, 2021

(54) METHOD AND APPARATUS FOR DETERMINING CONTEXT-AWARE SIMILARITY

(71) Applicant: Nokia Technologies Oy, Espoo (FI)

(72) Inventors: Hengshu Zhu, Beijing (CN); Huanhuan Cao, Beijing (CN); Jilei Tian, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/726,573

(22) Filed: Dec. 24, 2019

(65) Prior Publication Data

US 2020/0219137 A1 Jul. 9, 2020

Related U.S. Application Data

(63) Continuation of application No. 14/400,889, filed as application No. PCT/CN2012/075476 on May 14, 2012, now abandoned.

(51) Int. Cl.
*G06Q 30/02* (2012.01)
*G06F 8/70* (2018.01)

(52) U.S. Cl.
CPC .......... *G06Q 30/0269* (2013.01); *G06F 8/70* (2013.01); *G06Q 30/0254* (2013.01); *G06Q 30/0255* (2013.01)

(58) Field of Classification Search
CPC .... G06F 16/24575; G06F 9/545; H02J 50/12; H04W 4/029
USPC .......................................... 709/217; 345/158
See application file for complete search history.

(56) References Cited

U.S. PATENT DOCUMENTS

| | | | |
|---|---|---|---|
| 7,779,014 B2 | 8/2010 | York et al. | |
| 7,962,918 B2* | 6/2011 | Schaefer | G06F 9/545 |
| | | | 719/313 |
| 8,452,797 B1 | 5/2013 | Paleja et al. | |
| 2003/0158855 A1 | 8/2003 | Farnham et al. | |
| 2003/0182394 A1* | 9/2003 | Ryngler | H04W 4/029 |
| | | | 709/217 |
| 2008/0208774 A1 | 8/2008 | Kim et al. | |

(Continued)

FOREIGN PATENT DOCUMENTS

| | | |
|---|---|---|
| WO | 2010105244 A2 | 9/2010 |
| WO | 2012022831 A1 | 2/2012 |
| WO | 2012034288 A1 | 3/2012 |

OTHER PUBLICATIONS

Office Action for corresponding European Patent Application No. 12876682.1-1213, dated Jun. 3, 2020, 13 pages.
Office Action for corresponding European Patent Application No. 12876682.1-1217, dated Mar. 7, 2018, 10 pages.

(Continued)

*Primary Examiner* — Saba Dagnew
(74) *Attorney, Agent, or Firm* — Ditthavong, Steiner & Mlotkowski

(57) ABSTRACT

An approach is provided for determining the context-aware similarity between applications. A similarity platform processes one or more context logs associated with one or more devices to determine one or more context intents. The similarity platform further determines one or more distributions of one or more applications executed at the one or more devices with respect to the one or more context intents. The similarity platform also determines a context-aware similarity between two or more applications based, at least in part, on the one or more application distributions.

18 Claims, 10 Drawing Sheets

(56) References Cited

U.S. PATENT DOCUMENTS

| | | | |
|---|---|---|---|
| 2010/0223280 A1* | 9/2010 | Schneider | G06Q 10/10 707/769 |
| 2010/0299138 A1 | 11/2010 | Kim | |
| 2010/0312746 A1 | 12/2010 | Thollot et al. | |
| 2011/0175810 A1* | 7/2011 | Markovic | G06F 3/011 345/158 |
| 2011/0208730 A1 | 8/2011 | Jiang et al. | |
| 2012/0117015 A1 | 5/2012 | Sathish | |
| 2013/0086553 A1* | 4/2013 | Grechanik | G06F 8/70 717/123 |
| 2013/0198573 A1 | 8/2013 | Jirman et al. | |
| 2014/0122507 A1* | 5/2014 | Zeng | G06F 16/24575 707/749 |
| 2015/0188355 A1* | 7/2015 | Chuang | H02J 50/12 320/108 |

OTHER PUBLICATIONS

Office Action for corresponding Chinese Patent Application No. 2012800747042, dated Dec. 5, 2017, 21 pages, English Language Summary Included.

Office Action for corresponding Chinese Patent Application No. 2012800747042, dated Jun. 5, 2018, 8 pages, English Language Summary Included.

International Search Report for corresponding International Patent Application No. PCT/CN2012/075476, dated Feb. 7, 2013, 3 pages.

Office Action for corresponding Chinese Patent Application No. 2012800747042, dated Jul. 5, 2016, with partial translation, 17 pages.

Kebler, "Similarity Measurement in Context", Modeling and Using Context, vol. 4635 of the series Lecture Notes in Computer Science, 2007, pp. 277-290.

Office Action for corresponding European Patent Application No. 12876682.1, dated Nov. 17, 2015, 6 pages.

* cited by examiner

METHOD AND APPARATUS FOR DETERMINING CONTEXT-AWARE SIMILARITY

CROSS-REFERENCES TO RELATED APPLICATIONS

This application is a continuation of U.S. patent application Ser. No. 14/400,889, filed Nov. 13, 2014, which claims priority from PCT Application Serial No. PCT/CN2012/075476, filed May 14, 2012, the contents of which are hereby incorporated herein in their entirety by reference.

BACKGROUND

Service providers and device manufacturers (e.g., wireless, cellular, etc.) are continually challenged to deliver value and convenience to consumers by, for example, providing compelling network services. One area of interest is providing recommendations to consumers regarding, for example, applications and application categories. Accordingly, service providers and device manufacturers face significant technical challenges to improving and making the recommendations more relevant to consumers, particularly with respect to different contexts. For example, consumers may have different preferences (e.g., application preferences) depending on their contextual environments. For instance, a consumer may enjoy playing a scary game on a mobile device when the context or contextual environment is a rainy night.

SOME EXAMPLE EMBODIMENTS

Therefore, there is a need for an approach for determining the context-aware similarity between applications.

According to one embodiment, a method comprises processing one or more context logs associated with one or more devices to determine one or more context intents. The method also comprises determining one or more distributions of one or more applications executed at the one or more devices with respect to the one or more context intents. The method further comprises determining a context-aware similarity between two or more applications based, at least in part, on the one or more application distributions.

According to another embodiment, an apparatus comprises at least one processor, and at least one memory including computer program code for one or more computer programs, the at least one memory and the computer program code configured to, with the at least one processor, cause, at least in part, the apparatus to process one or more context logs associated with one or more devices to determine one or more context intents. The apparatus is also caused to determine one or more distributions of one or more applications executed at the one or more devices with respect to the one or more context intents. The apparatus is further caused to determine a context-aware similarity between two or more applications based, at least in part, on the one or more application distributions.

According to another embodiment, a computer-readable storage medium carries one or more sequences of one or more instructions which, when executed by one or more processors, cause, at least in part, an apparatus to process one or more context logs associated with one or more devices to determine one or more context intents. The apparatus is also caused to determine one or more distributions of one or more applications executed at the one or more devices with respect to the one or more context intents. The apparatus is further caused to determine a context-aware similarity between two or more applications based, at least in part, on the one or more application distributions.

According to another embodiment, an apparatus comprises means for processing one or more context logs associated with one or more devices to determine one or more context intents. The apparatus also comprises means for determining one or more distributions of one or more applications executed at the one or more devices with respect to the one or more context intents. The apparatus further comprises means for determining a context-aware similarity between two or more applications based, at least in part, on the one or more application distributions.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method described herein.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for determining the context-aware similarity between applications are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
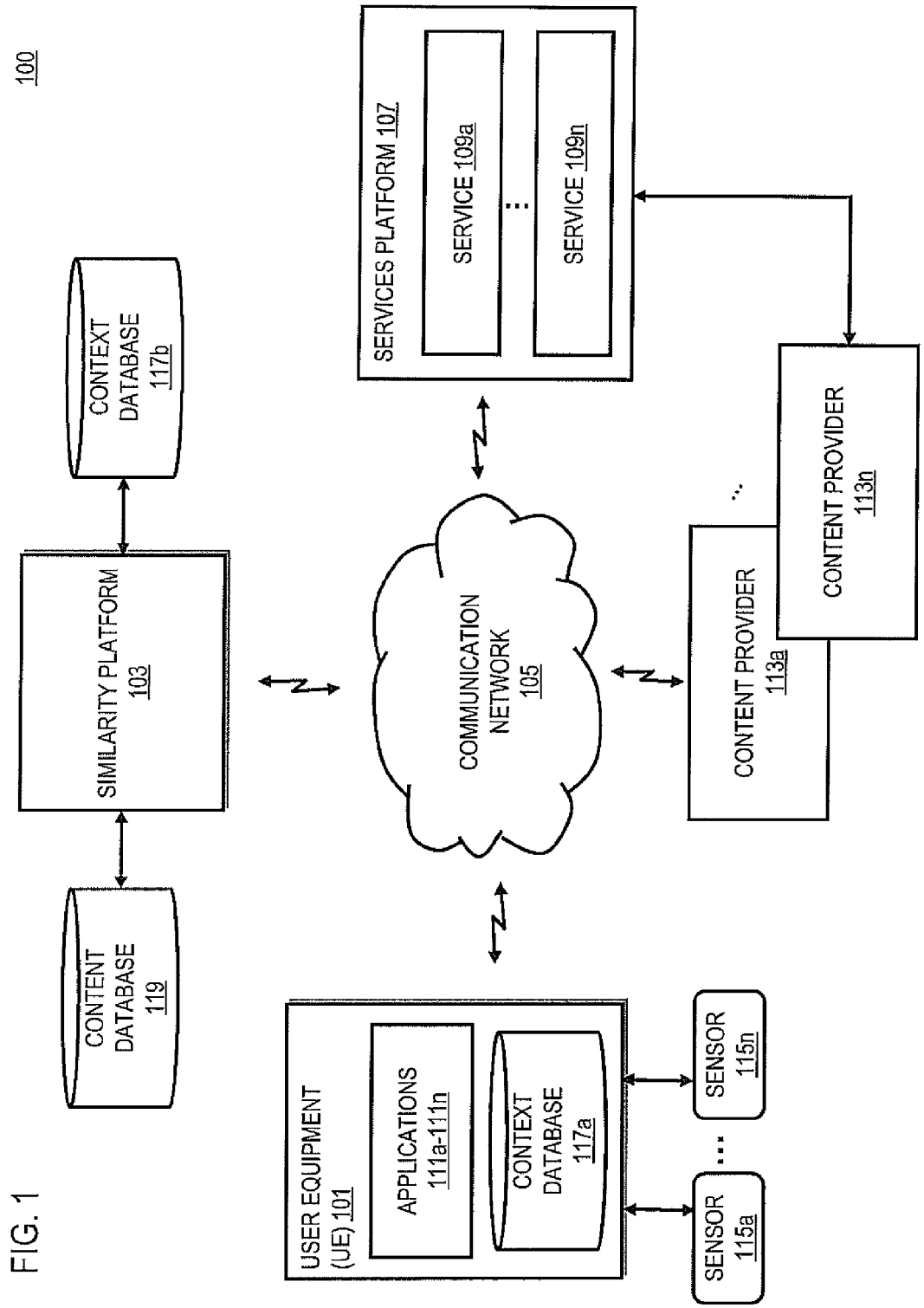
FIG. 1 is a diagram of a system capable of determining the context-aware similarity between applications, according to one embodiment.

FIG. 1 is a diagram of a system capable of determining the context-aware similarity between applications, according to one embodiment, As discussed above, current recommendation services rely on determining content similarities between recommended applications. Such services are based on content-similarity determinations. However, content-similarity determinations do not recognize the changes in preferences and/or behavior with respect to user and applications that are based on different contexts. For example, action games may be similar to music when given a context of relaxing or entertainment at home. A user that is enjoying entertainment at home can just as easily play an action game as listen to music. However, when given a context of a moving scenario, such as driving a car, the action games are no longer similar to music. In a moving scenario, such as driving a car, the primary focus of the attention of the user must be driving the car. Thus, the user cannot focus her attention on action games. However, as listening to music can be a background activity (e.g., not the primary activity), a user can still listen to music while driving a car. Thus, the above example illustrates how, based on different contexts, the preferences of a user may change despite no changes to content.

To address this problem, a system 100 of FIG. 1 introduces the capability to determine the context-aware similarity between applications. For example, for recommendation systems or embedded advertisement systems, if a user often plays the game Angry Birds during the context of holiday evening at home, the system 100 provides the ability to determine what other applications the user will also like to play given a similar context and provide the information to the systems. The system 100 measures the similarity between other applications and the Angry Birds application with respect to the given context holiday evening at home. The system 100 accounts for different similarities between two applications for different contexts. For example, both action games applications and music are similar to videos, given a context of relaxing or entertainment at home. However, for a given context of a moving scenario, the applications of action games may not be similar to videos because playing action games may be too difficult to do while moving. However, listening to music and/or watching videos when on the move may be possible. Thus, the system 100 providers the ability to determine the context-aware similarities between applications for given contexts and provide the similarities to the recommendation system and/or provide recommendations accordingly.

The system 100 introduces the capability to mine context logs associated with user devices to determine latent context intents associated with various contexts and usage of applications with respect to the contexts. Based on this analysis, the system 100 allows for the determination of probabilistic distributions of applications and contexts with respect to latent context intents to determine user preferences with respect to the applications for various context intents and contexts. Based on these distributions, the system 100 provides the capability to determine the context-based similarity between two or more applications given a specified context that allows for the context-aware recommendation of the applications.

The determination of the context-aware similarity between applications arises from the recognition that different applications have different context-aware usage preferences because of different context-driven intents. For example, user may play games on their UE 101 during contexts that may indicate entertainment or time wasting. Thus, different applications will have different appearance probabilities in different context intents. Different contexts will similarly have different appearance probabilities in different context intents. Recognizing the two distributions of applications and contexts under the context intents, the system 100 allows for the generation of a probabilistic model that can estimate the similarity between two different applications for a specific context. Further, this estimation of the similarity can be independent of the content of the two different applications. However, in one embodiment, the estimation of the similarity between two applications can be combined with an estimation of the content similarity of the two applications to further determine a total similarity between the two applications.

As shown in FIG. 1, the system 100 comprises a user equipment (UE) 101 having connectivity to a similarity platform 103 via a communication network 105. However, in one embodiment, there can be multiple UE 101 within the system 100. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, near field communication (NFC), Internet Protocol (IP) data casting, digital radio/television broadcasting, satellite, mobile ad-hoc network (MANET), and the like, or any combination thereof.

The UE 101 is any type of mobile terminal, fixed terminal, or portable terminal including a mobile handset, station, unit, device, mobile communication device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

The UE 101 may include one or more applications 111a-111n (collectively referred to as applications 111) that may perform functionality and/or processes at the UE 101. The applications 111 may be any type of application, including gaming applications, multimedia (e.g., audio, video, etc.) presentation applications, information presentation applications, social networking applications, navigational applications, calendar applications, recommendation applications, Internet browsing applications, retail applications, advertisement applications, etc. In one embodiment, one or more applications may be combined into a single application or a single application may include the functionality of multiple applications. For example, a navigational application may be combined with an advertisement application such that, while a user is receiving navigational information, the advertisement application may provide one or more advertisements.

One or more applications 111 executed at the UE 101 may determine context information associated with the UE 101 and/or the user of the UE 101. By way of example, one or more applications 111 may determine the location of the UE 101 through a global positioning system (e.g., GPS). In such an example, the one or more applications 111 may interface with one or more sensors 115a-115n (collectively referred to as sensors 115) associated with the UE 101. A sensor 115a may interface with GPS to determine the position of the UE 101 and pass the information to the one or more applications 111. By way of another example, one or more applications 111 may interface with other sensors 115 associated with the UE 101, such as one or more ambient light sensors. The one or more applications 111 may use the information from the ambient light sensor. By way of another example, one or more applications 111 may determine context information associated with the UE 101 and/or the user of the UE 101 without interfacing with the sensors. One or more applications may include, for example, calendar information, such as appointments that can constitute context information. One or more applications may include entertainment information, such as what type of music a user listens to, what videos a user watches, and the corresponding times. This information may also constitute context information.

The UE 101 may be associated with or include a context database 117a that may include one or more context logs. The context logs may be generated by the applications 111 that determine context information regarding the UE 101 and/or the user of the UE 101. For example, the one or more applications 111 may store the context information discussed above, such as the location information, ambient light information, media information, etc. within the context logs stored in the context database 117a. In one embodiment, the sensors 115 may be configured to store the context information that they detect in one or more context logs within the context database 117a. Further, in one embodiment, one of the applications 111a may have the function of interfacing with the other applications 111 and/or the sensors 115 for determining context information associated with the UE 101 and/or the user of the UE 101 and storing the context information in one or more context logs in the context database 117a. In one embodiment, the similarity platform 103 includes a context database 117b. The one or more applications 111 and/or the one or more sensors 115 may be configured to store the context information collected at the UE 101 at one or more context logs stored within the context database 1117b associated with the similarity platform 103. When there are multiple UE 101 within the system, the context logs may be associated with specific UE 101. Accordingly, when the similarity platform 103 processes the context information, the similarity platform 103 can retrieve the context information from the context database 117b rather than, for example, interfacing with the context database 117a at the UE 101.

The system 100 also includes a services platform 107. The services platform 107 includes one or more services 109a-109n (collectively referred to as services 109) that may provide any type of service to the system 100. By way of example, the services 109 may include social networking services, content (e.g., audio, video, images, etc.) provisioning services, navigational services, application services, storage services, contextual information determination services, location based services, information (e.g., weather, news, etc.) based services, etc. The contextual information determination services may determine contextual information associated with the UE 101 to supplement and/or aid in the applications 111 and/or the sensors 115 determining contextual information associated with the UE 101 and/or the user of the UE 101.

The system 100 further includes one or more content providers 113a-113 (collectively referred to as content providers 113) that may provide content to the UE 101 and/or the services 109. The content provided may be any type of content, such as applications, audio content (e.g., music, ringtones, etc.), video content (e.g., movies, commercials, televisions programming, etc.), image content (e.g., photographs, artwork, clip art, etc.), and the like. In one embodiment, the content providers 113 may provide context information that may supplement context information determined by one or more of the applications 111, the sensors 115, or a combination thereof. By way of example, the content providers 113 may provide context information, such as weather information, news information, etc. that may be processed or aid in the processing of context information associated with the UE 101. In one embodiment, the content providers 113 may also store information and/or content associated with the UE 101 and/or the services 109. In one embodiment, the content providers 113 may offer a central repository of data, and offer a consistent, standard interface to data, such as a repository for applications, advertisements, music, videos, images, etc.

The similarity platform 103 performs the processes and functionality in determining context-aware similarity between applications with respect to different contexts. The similarity platform 103 provides a framework for measuring context-aware application similarity by mining one or more users' context logs. As discussed above, the context logs consist of context records. The context records consist of timestamps associated with context information that was determined at the time of the timestamp. The context records may include context information in the form of application usage information associated with context features and their corresponding values. By way of example, the context features may include the day of the week, the time of day, and the location of the UE 101. Values for these features may include, for example, Monday, 8:00 AM, and Washington, D.C., respectively. The application usage information may include, for example, what application was running at the time of the time stamp, or a categorization of the application that was running at the time of the time stamp. For example, if the user was playing an action game on Monday at 8:00 AM in Washington, D.C., an activity record associated with the context record may be Playing Action Game. In one embodiment, the context logs may include groups of atomic context features. By way of example, the context logs may include context feature value pairs of day: Monday and location: home.

Upon mining the context records, the similarity platform 103 determines context-aware usage preferences associated with the applications by re-organizing the context records by application categories. The relation of the application categories to the context records, and the context features within the context records, associates the various applications with the contexts during which the applications executed. By way of example, context records that are associated with applications such as games are grouped together, and context records that are associated with applications such as Internet browsing are grouped together. The context records associated with the groups of applications constitute the context-aware usage preferences associated with the various groups. The various context features associated with the context records indicate the contexts that users use the various applications.

Based on these context-aware usage preferences, the similarity platform 103 mines the latent context intents of the usage of the applications to determine the various intents of the users while executing the various applications. For example, certain context features may indicate the context intent of relaxing while moving, such as during a walk, a bus ride, a train ride, and/or an airplane ride, where the primary attention of a user may be directed towards an application although the user is moving. Other context features may indicate the context intent of relaxing at home, such as watching a movie, listening to music, reading a book, etc. while using a mobile device at a location designated as a user's home. Further, other context features may indicate the context intent of commuting between home and work, such as where the user is moving during a certain time of the day. The context intents may be any type of intent that is derived from the context records that shows a pattern between the context and application usage derived from the context-aware usage preferences. The similarity platform 103 may determine the context intents using any type of analysis of the context-aware usage preferences, such as through matrix factorization, tensor factorization, topic models, etc.

Upon determining the latent context intents, the similarity platform 103 maps the various applications and determined contexts to the different latent context intents. Each application and context may be represented by a distribution of the determined context intents. The distributions may be described as P(i|a) and P(c|i), where a is an application, c is a given context and i is a given latent context intent. These two distributions P(i|a) and P(c|i) may be determined in a training process, such as, by example, determining a number of times an application appears in the context logs associated with context records and/or context features that are related to a specific latent context intent. Based on the distributions, the probability P(i|c,a) that a context and an application are associated with a latent context intent may be determined according to:

$$P(i \mid c, a) = P(a)P(i \mid a)P(c \mid i) / P(c, a)$$

$$= P(i \mid a)P(c \mid i) / \sum_l lP(i \mid a)P(c \mid i)$$

where P(i|a) and P(c|i) are obtained from the training process described above.

Based on the above determination of the probabilities for the contexts and the applications, the similarity platform 103 can determine a context-aware similarity between two applications for a given context. To determine the context-aware similarity between the two applications, the similarity platform 103 may leverage Euclidean distance, cosine distance, KL divergence, etc. By way of example, the context-aware similarity may be determined according to:

$$P(i_k|c, a_1)\|P(i_k|c, a_2)$$

where c is the given context, $i_k$ is the context intent and $a_1$ and $a_2$ are the two applications being compared. This provides a trained context-aware model that can be used to determine the similarities between various applications.

Based on the context-aware similarity between two applications for a given context, the similarity platform 103 can determine one or more applications, for example, to recommend to a user based on the current context the user, and based on one or more applications the user has previously associated with the context by, for example, executing the applications during the context. Accordingly, the similarity platform 103 can determine similarities between applications that accommodate changing contexts of users to provide context-aware recommendations to users. The similarity platform 103 can similarly recommend groups of applications by determining similarity within and between the groups by determining the pair-wise application similarity of the applications within and between the groups. Once the context-aware similarity (or distance) is determined between two applications, the distance may be used to determine all kinds of distances between any two points for high dimensional spaces. Further, the latent context intents associated with the contexts and the applications can be further leveraged for other recommendation services to obtain context-aware similarities and recommendations, such as providing context-aware embedded advertisements.

In one embodiment, in addition to determining the context-aware similarity between two or more applications, the similarity platform 103 can also determine content-aware similarity between the two or more applications. The content-aware similarity may be based on the content associated with the two or more applications. Thus, for example, an application of an action-based game may be similar content wise to another action-based game. The similarity platform 103 may determine the content-aware similarity between the two or more applications by existing approaches based in textual retrieval, such by using language models, Pearson correlation, etc. In one embodiment, the similarity platform 103 may be associated with or include a content database 119. The content database 119 may include information and/or descriptions regarding the various applications 111 that may be executed at the UE 101 and upon which content-aware similarities may be determined. In one embodiment, one or more services 109 and/or one or more content providers 113 may provide the content information with respect to the applications 111. By way of example, a service 109a that provides an application may provide content information regarding the application to the similarity platform 103 so that the similarity platform 103 can determine the content-aware similarity between the application and other applications.

After determining the content-aware similarity between the two or more applications, the similarity platform 103 can combine the context-aware similarity and the content-aware similarity (e.g., content similarity) of the two or more applications to generate a total similarity between the two or more applications. In one embodiment, the similarity platform 103 may determine weighting factors associated with the context-aware similarity and the content aware similarity to affect which similarity is given more weight. Such weighting factors may be based on, for example, the current context of the user and/or the UE 101 associated with the user, the current content associated with the applications, or a combination thereof. Accordingly, the total similarity may be determined according to:

$$\text{Total Similarity} = [P(i_k|c,a_1) \| P(i_k|c,a_2)]^{W1} * \text{Content Similarity}(a_1,a_2)^{W2}$$

where W1 and W2 represent the weighting factors associated with the context-aware similarity and the content aware similarity, respectively.

By way of example, the UE 101, the similarity platform 103, the services platform 107, and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
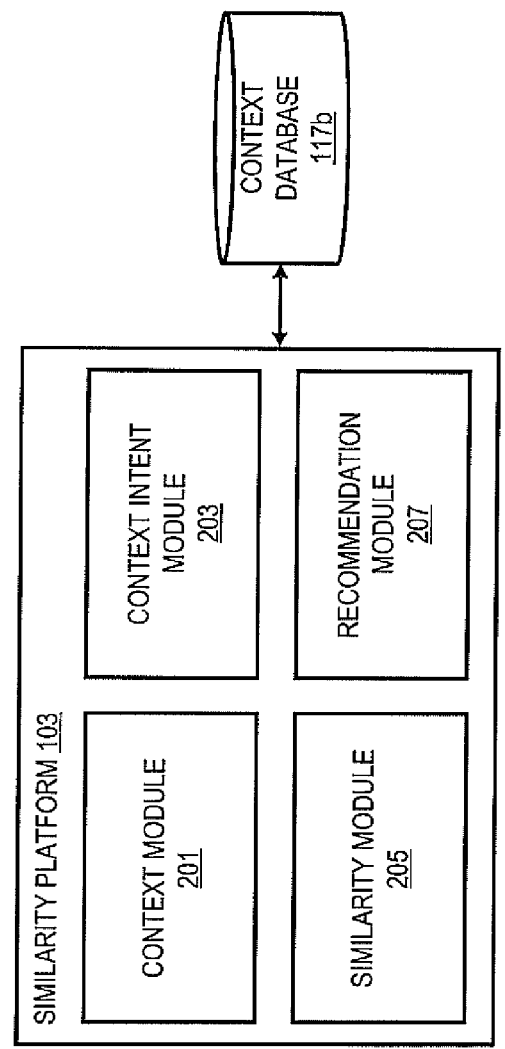
FIG. 2 is a diagram of the components of a similarity platform, according to one embodiment.

FIG. 2 is a diagram of the components of a similarity platform 103, according to one embodiment. By way of example, the similarity platform 103 includes one or more components for determining the context-aware similarity between applications. It is contemplated that the functions of these components may be combined in one or more components or performed by other components of equivalent functionality. For example, the function of these components may be performed by one or more services 109 on the services platform 107 and/or by one or more applications 111 executed on the UE 101. In this embodiment, the similarity platform 103 includes a context module 201, a context intent module 203, a similarity module 205 and a recommendation module 207.

The context module 201 determines the context information from the context logs within the context database 117a at the UE 101 or the context database 117b. The context module 201 collects the context information to process for determining, for example, the context features, context values of the context features, and the application usage information from the UE 101. In one embodiment, as discussed above, an application 111a on the UE 101 may interface with the similarity platform 103 to deliver the context information associated with the UE 101 to the similarity platform 103, which may be stored within the context database 117b. In such an embodiment, the application 111a interfaces with the context module 201 to deliver the context information to the similarity platform 103 for processing. In one embodiment, the context module 201 may directly interface with one or more applications 111 at the UE 101 that determine context information of the UE 101 and/or the user of the UE 101 to collect the context information. Further, in one embodiment, the context module 201 may directly interface with the context database 117a at the UE 101 to collect the context information from the context logs within the context databases 117a to process and/or store within the context database 117b. As discussed above, the context information may include, for example, context records associated with days of the week, months of the year, timestamps, location information, ambient light information, acceleration information, application usage information, or any other type of context information regarding the UE 101 and/or the user of the UE 101. In one embodiment, the context information may include information pertaining to user preferences and/or user behavior. However, the user behavior may also be determined based on processing the context information that may not directly include behavior information.

The context intent module 203 performs the processing and/or facilitates the processing of the context information collected by the context module 201 for determining the context intents associated with the applications and/or the contexts from the context logs. The context intent module 203 determines context-aware usage preferences associated with applications 111 executed at the UE 101 by re-organizing acquired context records according to application categories. By way of example, context records that are associated with gaming applications are grouped together, context records that are associated with Internet browsing applications are grouped together, context records that are associated with magazine or book reading applications are grouped together, etc. Accordingly, these groupings constitute context-aware usage preferences as the usage of the applications are grouped based on the context features and context records. Namely, the relation of the application categories to the context records, and the context features within the context records, associates the various applications with the contexts during which the applications are generally executed.

The context intent module 203 further determines the latent context intents from the context-aware usage preferences of the applications to determine the various latent intents of the users while executing the various applications. As discussed above, certain context features may indicate the context intent of relaxing while moving, relaxing at home, working at the office, commuting between home and the office. However, the latent context intents may be any type of intent that is derived from the context records that shows a pattern between the context and application with the usage of the application as derived from the context-aware usage preferences. The context intent module 203 derives the latent context intents through, for example, matrix factorization, tensor factorization, topic models, etc. of the context-aware usage preferences.

Upon determining the latent context intents, the context intent module 203 distributes the applications and contexts derived from the context logs across the different latent context intents. The context intent module 203 may determine the distributions according to P(i|a) and P(c|i), where a is an application, c is a given context and i is a given latent context intent. These two distributions P(i|a) and P(c|i) may be determined based on one or more training processes. According to the distributions, the probability P(i|c,a) that a context and an application are associated with a latent context intent can be determined based on P(i|a)P(c|i)/ΣI P(i|a)P(c|i,).

The similarity module 205 determines the context-aware similarity between two or more applications for a given context and the content-aware similarity between two or more applications based on their content. With respect to the context-aware similarity, the similarity module 205 determines context-aware similarities between two applications for a given context by leveraging Euclidean distance, cosine distance, KL divergence, etc. As discussed above, the similarity platform 103 by way of the similarity module 205 determines the context-aware similarity based on, for example, $P(i_k|c,a_1) \| P(i_k|c,a_2)$, where c is the given context, $i_k$ is the context intent and $a_1$ and $a_2$ are the two applications being compared. According to the following similarity determination, the similarity module 205 provides a trained model for determining the context-aware similarity between two or more applications for a given context.

The similarity module 205 may also determine the content-aware similarity between two or more applications that is based on the content of the applications. The similarity module 205 may determine the content-aware similarity between two or more applications by existing approaches based in textual retrieval, such by using language models, Pearson correlation, etc. The similarity module 205 may retrieve information regarding the content of application from the content database 119.

Upon determining the context-aware similarity and the content-aware similarity for two or more applications, the similarity module 205 can combine the two similarities to generate a total similarity. In one embodiment, the similarity module 205 can determine weighting factors associated with the two similarities to weight the similarities differently in determining the total similarity. Such weighting factors may be based on, for example, the current context of the user and/or the UE 101 associated with the user, the current content associated with the applications, or a combination thereof. Based on the above discussion of the context-aware similarity calculation, the total similarity may be determined according to:

Total Similarity=$[P(i_k|c,a_1) \| P(i_k|c,a_2)]^{W1}$*Content Similarity$(a_1,a_2)^{W2}$ where W1 and W2 represent the weighting factors associated with the context-aware similarity and the content-aware similarity, respectively.

Based on the context-aware similarity, with or without the content-aware similarity, between two applications for a given context, the recommendation module 207 can determine one or more applications, for example, to recommend to a user based on the context currently associated with the user and/or a UE 101 associated with the user. Accordingly, based on the similarity calculations performed by the similarity module 205, the recommendation module 207 can recommend one or more applications according to the context-aware similarity between applications. Thus, although two or more applications may be similar based on the content of the applications, the recommendation module 207 can take into consideration the context a user is currently associated with and provide recommendations regarding the context and as the context relates to the two applications. The recommendation module 207 can further leverage the one or more latent context intents for other services, such as providing the latent context intents to other recommendation services to provide recommendations based on context-aware similarities.

Figure 3:
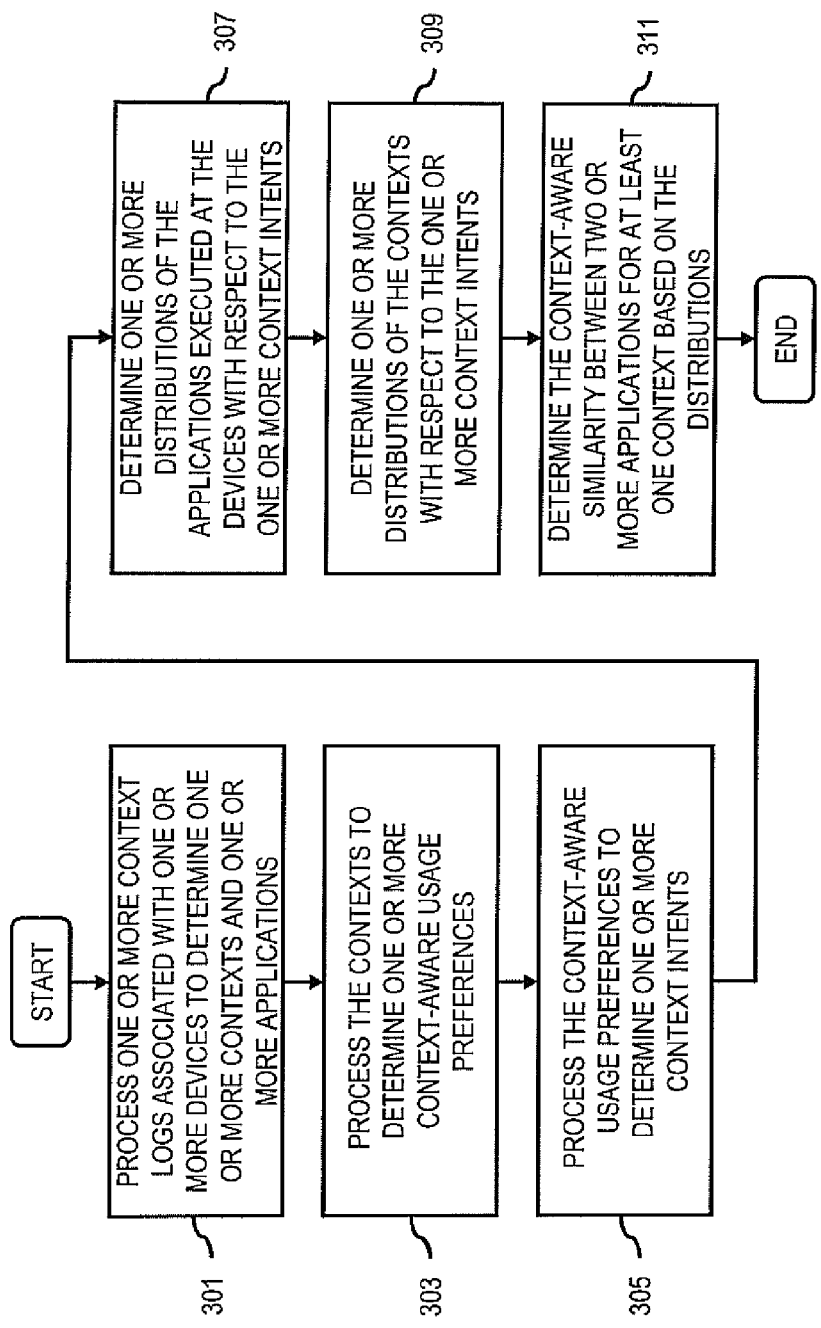
FIG. 3 is a flowchart of a process for determining the context-aware similarity between applications, according to one embodiment.
Figure 8:
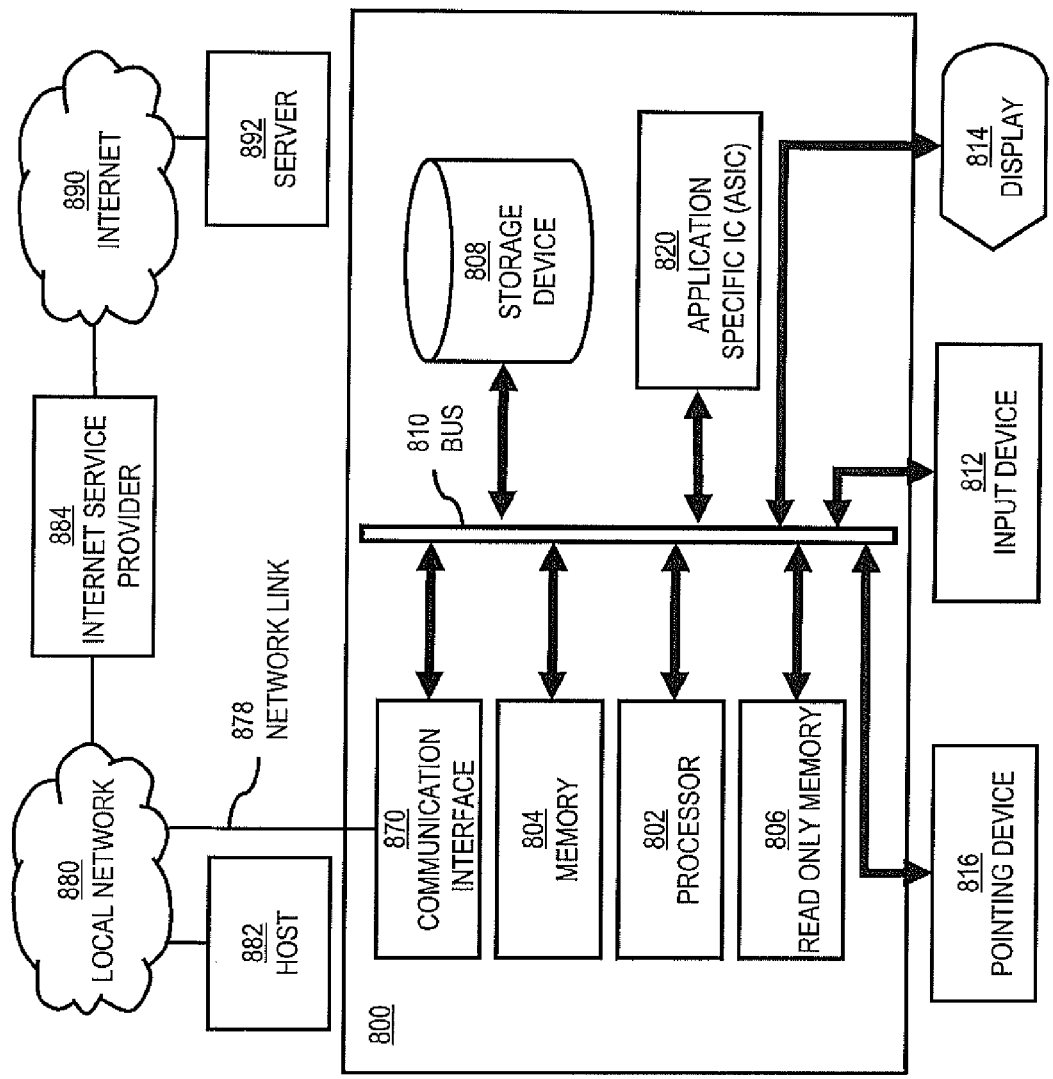
FIG. 8 is a diagram of hardware that can be used to implement an embodiment of the invention.

FIG. 3 is a flowchart of a process for determining the context-aware similarity between applications, according to one embodiment. In one embodiment, the similarity platform 103 performs the process 300 and is implemented in, for instance, a chip set including a processor and a memory as shown in FIG. 8. In step 301, the similarity platform 103 processes and/or facilitates a processing of one or more context logs associated with one or more devices to determine one or more contexts and one or more applications executed at the one or more devices that are associated with the contexts. The similarity platform 103 may process the context logs by determining which context records within the context logs are associated with the applications. Context records that are not associated with the execution of one or more applications may be disregarded. The similarity platform 103 also determines the time (e.g., such as a timestamp) associated with the context records that are associated with an execution of an application.

In step 303, the similarity platform 103 processes and/or facilitates a processing of the collected content information to determine one or more context-aware usage preferences with respect to the one or more applications. The similarity platform 103 associates or groups the context records, including the context features and values of the context features, that are associated with a type/category of application (e.g., gaming, educational, etc.) together to determine the context-aware usage preferences for the type/category of applications. The groupings of the context records for the types/categories of applications describe the contexts that are normally associated with the execution of the applications. Thus, the grouping of contexts can define the context-aware usage preferences.

In step 305, the similarity platform 103 processes and/or facilitates a processing of the one or more context-aware usage preferences to determine the one or more context intents. The one or more context intents may be the latent intents of the user that describe the intent of the user as shown by the user executing the application during the specified context defined by the context records. By way of example, a user may repeatedly play games on a UE 101 during the context of holiday evening at home. Based on this context and application usage, the similarity platform 103 may determine the context intent of relaxing at home. The latent context intents define the intents of users as determined according to the contexts of application usage. The latent context information may then be modeled and used across services for providing recommendations to the users based on the context intents. The recommendations may then be based on context intent, rather than purely content.

In step 307, the similarity platform 103 determines one or more distributions of one or more applications executed at the one or more devices with respect to the one or more context intents. The distributions may represent probabilities that a specific application is associated with a specific context intent. Different applications will have different distributions with respect to the context intents. For example, educational/reference applications will have a higher appearance or probability associated with context intents of, for example, at work, at school, studying, etc. than playing action games, viewing multimedia, etc. However, action games may have a higher appearance or probability associated with entertainment at home than educational/reference applications. Accordingly, the distributions associate various applications with various context intents more than other context intents. In one embodiment, in step 309, the similarity platform 103 may perform a similar analysis of determining distributions of the contexts with respect to the determined context intents. The similarity platform 103 can determine the probability that contexts are associated with the determined context intents.

In step 311, the similarity platform 103 determines the context-aware similarity between two or more applications based, at least in part, on the one or more application distributions. When given two applications and a context, the similarity platform 103 in step 311 can measure the similarity be estimating the context-aware distance between the two distributions determined for the two applications in combination with the distribution determined for the context. Thus, as discussed above, the context-aware similarity may be determined by leveraging Euclidean distance, cosine distance, or KL divergence, for example. Thus, the similarity platform 103 can determine the probability that the two applications are contextually similar for a given context. Based on the context-aware similarity determination, the similarity platform 103 can provide one or more recommendations and leverage the context-aware similarity determinations to other services, such an advertisement recommendation and the like.

Figure 4:
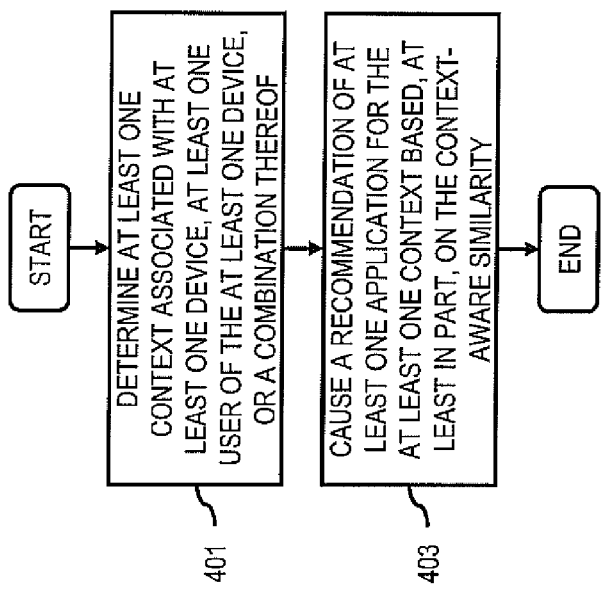
FIG. 4 is a flowchart of a process for providing a recommendation based, at least in part, on a context-aware similarity determination, according to one embodiment.

FIG. 4 is a flowchart of a process for providing a recommendation based, at least in part, on a context-aware similarity determination, according to one embodiment. In one embodiment, the similarity platform 103 performs the process 400 and is implemented in, for instance, a chip set including a processor and a memory as shown in FIG. 8. In step 401, the similarity platform 103 determines at least one context associated with at least one device, at least one user of the at least one device, or a combination thereof. The context may be determined by the context module 201 based on current context information associated with the UE 101 and/or the user of the UE 101. The context information may indicate, for example, the time of day, the location, acceleration information, etc. Based on the current context information, the similarity platform 103 can determine the current context intent associated with the user. By way of example, if the context information indicates that the user is currently home, not moving and the time is after 8:00 PM, the similarity platform 103 may determine that the context intent of the user is entertainment at home. Thus, the context information may indicate that the user is currently at home enjoying some form of entertainment.

In step 403, the similarity platform 103 may cause, at least in part, a recommendation of at least one application for the at least one context based, at least in part, on the context-aware similarity. The recommendation may be determined based, at least in part, on context-aware similarities between two applications in association with the determined context. Thus, application pairs that are associated with high context-aware similarities for the given context may be recommended to the user. A high context-aware similarity may be a similarity above a certain threshold. The threshold may be determined based on, for example, the pair-wise similarities determined for all of the applications for the given context intent. Thus, applications may be recommended that are associated with high context-aware similarity scores for the context intent of entertainment at home, such as applications concerning enjoying multimedia content (e.g., audio, video, books, etc.), applications concerning video games, and the like. In one embodiment, the user may be currently executing an application at the UE 101 upon the determination of the context information. In such an embodiment, the recommendation may be further based on the context-aware similarities determined for the specific application executed at the UE 101 with respect to the determined context intent. Thus, if the user is playing a game during the context intent of entertainment at home, the similarity platform 103 may recommend one or more applications that are similar to a game in the context intent of entertainment at home. Further, if the application is an action game, the similarity platform 103 can further determine the recommendation based on the content of action with respect to the game.

Figure 5:
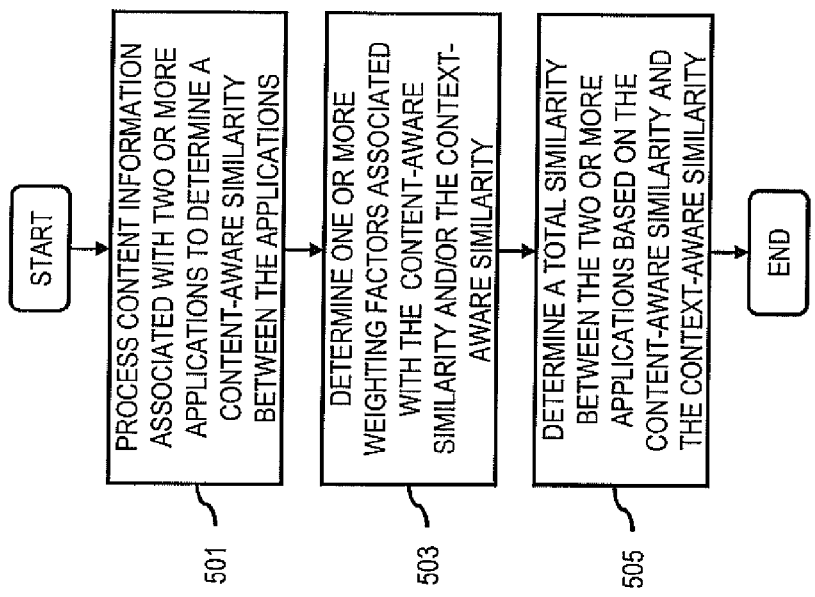
FIG. 5 is a flowchart of a process for determining a total similarity between applications based on context-aware and content-aware similarities, according to one embodiment.

FIG. 5 is a flowchart of a process for determining a total similarity between applications based on context-aware similarity and content-aware similarity, according to one embodiment. In one embodiment, the similarity platform 103 performs the process 500 and is implemented in, for instance, a chip set including a processor and a memory as shown in FIG. 8. In step 501, the similarity platform 103 processes and/or facilitates a processing of content information associated with the two or more applications to determine a content-aware similarity between the two or more application. As discussed above, associated with the similarity platform 103 may be a content database 119 that includes content information associated with the applications 111 that are currently associated with the UE 101. The content database 119 may also include content information with respect to other applications that may be recommended to the user of the UE 101 and downloaded to the UE 101. The similarity platform 103 may query the content database 119 to determine content information regarding two or more applications and perform a content analysis regarding the content information to determine the content-aware similarity between the two applications. The content-aware similarity analysis may be based on, for example, language models, Pearson correlation, etc. In one embodiment, the process 500 may then proceed to step 503 in association with determining one or more weighting factors. However, in one embodiment, the process 500 may proceed directly to step 505.

In step 503, the similarity platform 103 determines one or more weighting factors associated with the content-aware similarity, the context-aware similarity, or a combination thereof. The one or more weighting factors may be based on, for example, the current context associated with a user and/or a UE 101 associated with the user. The one or more weighting factors also may be based on, for example, content of the one or more applications. However, the weighting factors may be based on any type of determination to adjust the weight of the context-aware similarity compared to the weight of the content-aware similarity.

In step 505, the similarity platform 103 determines a total similarity between the two or more applications based, at least in part, on the content-aware similarity and the context-aware similarity. As discussed above, the total similarity may be determined according to:

$$\text{Total Similarity} = [P(i_k|c,a_1) \| P(i_k|c,a_2)]^{W1} * \text{Content Similarity}(a_1,a_2)^{W2}$$

where W1 and W2 represent the weighting factors associated with the context-aware similarity and the content-aware similarity, respectively, determined, if at all, in step 503. Thus, step 505 allows for both the context-aware similarity and the content-aware similarity of two applications to affect the total similarity determination associated with two applications.

Figure 6:
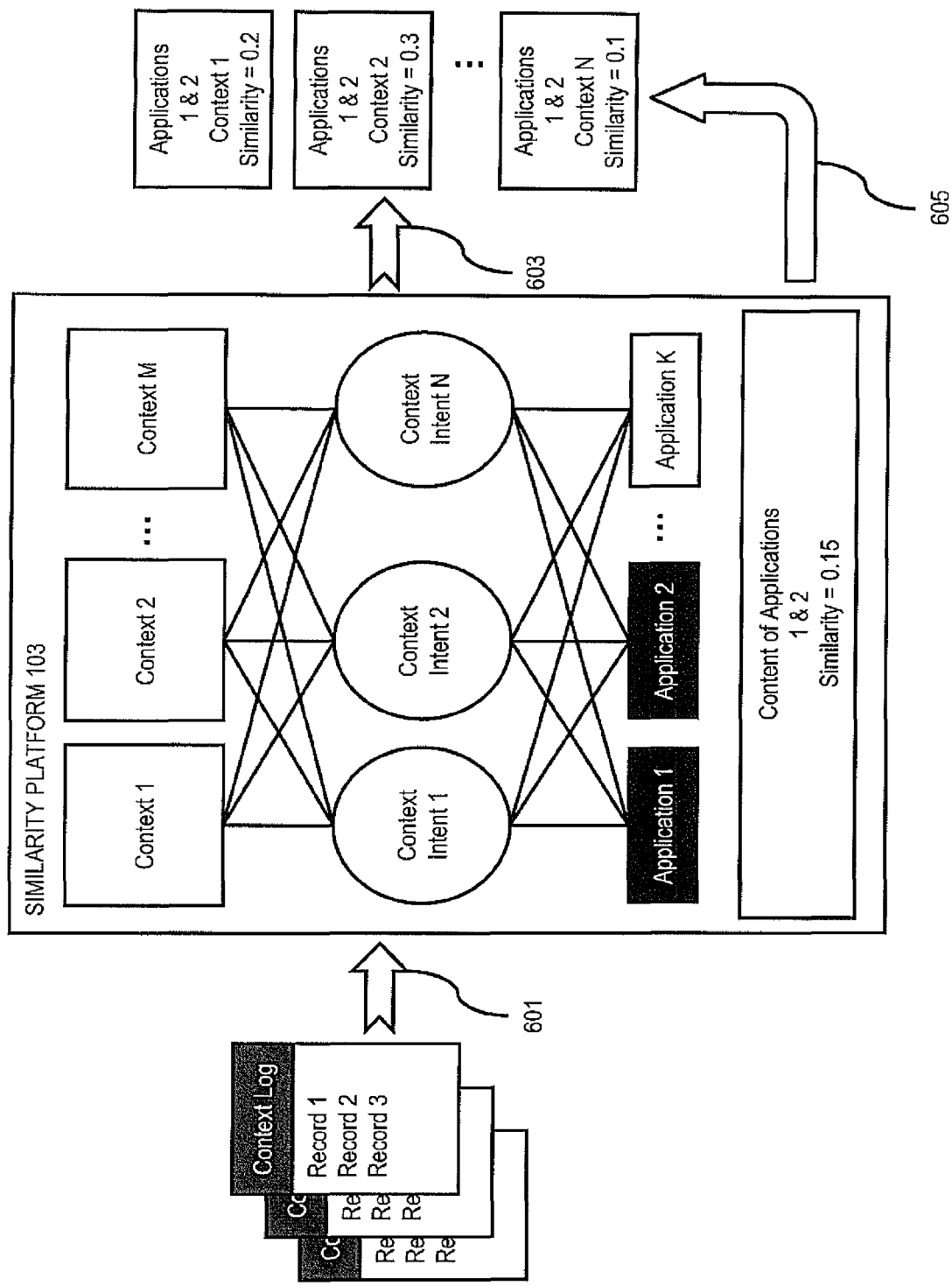
FIG. 6 is a diagram illustrating the processes of FIG. 3-5, according to one embodiment.

FIG. 6 is a diagram illustrating the processes of FIG. 3-5, according to one embodiment. As illustrated, the similarity platform 103 collects (e.g., at indicator 601) multiple context logs. The context logs include multiple context records (e.g., Record 1-Record 3) that include context information regarding the users of the UE 101 that are associated with the similarity platform 103. The context information may include information such as, for example, location information, movement information, ambient light information, navigation information, in addition to timestamps for the acquired information and information regarding what applications were being executed at the UE 101 during the collection of the context information. The similarity platform 103 processes the collected context information to determine the contexts (e.g., Context 1 through Context M) and the context intents (e.g., Context Intent 1 through Context Intent N). The context intents are determined based on the above discussion by determining context-aware usage preferences and distributing the contexts and applications between the context intents. By way of example, for M number of contexts and K number of applications, there may be N number of context intents, where N<M depending on the determination of the intents.

As designated by indicator 603, the similarity platform 103 may then determine the context-aware similarity of two applications (e.g., Application 1 and Application 2) for the various determined contexts based on the distributions or probabilities determined for the applications with respect to the context intents. Thus, by way of example, for Context 1 Applications 1 and 2 may have a similarity of 0.2, for Context 2 Applications 1 and 2 may have a similarity of 0.3 all the way through Context N for which Applications 1 and 2 may have a similarity of 0.1. Accordingly, the similarity platform 103 may determine the context-aware similarities between two applications for multiple contexts, and apply the similarity of the two applications to a user based on the user's given context.

Further, as designated by indicator 605, the similarity platform 103 may determine, rather than only a context-aware similarity between the two applications, a total similarity between the two applications based on the different contexts as well as the similarity between the content of the two applications. The similarity platform 103 may determine the content of the applications from the content providers 113 and/or services 109 that provide the applications. As illustrated, the content-aware similarity of the two applications may be 0.15. The illustrated similarities for Context 1 through Context N may be adjusted to accommodate the content-aware similarity between the two applications along with the context-aware similarity such that the illustrated similarities are total similarities between the two applications for given contexts. Accordingly, the similarity platform 103 may determine the total similarities between two applications for multiple contexts, as well as content of the applications, and apply the total similarity of the two applications to a user based on the user's given context.

Figure 7:
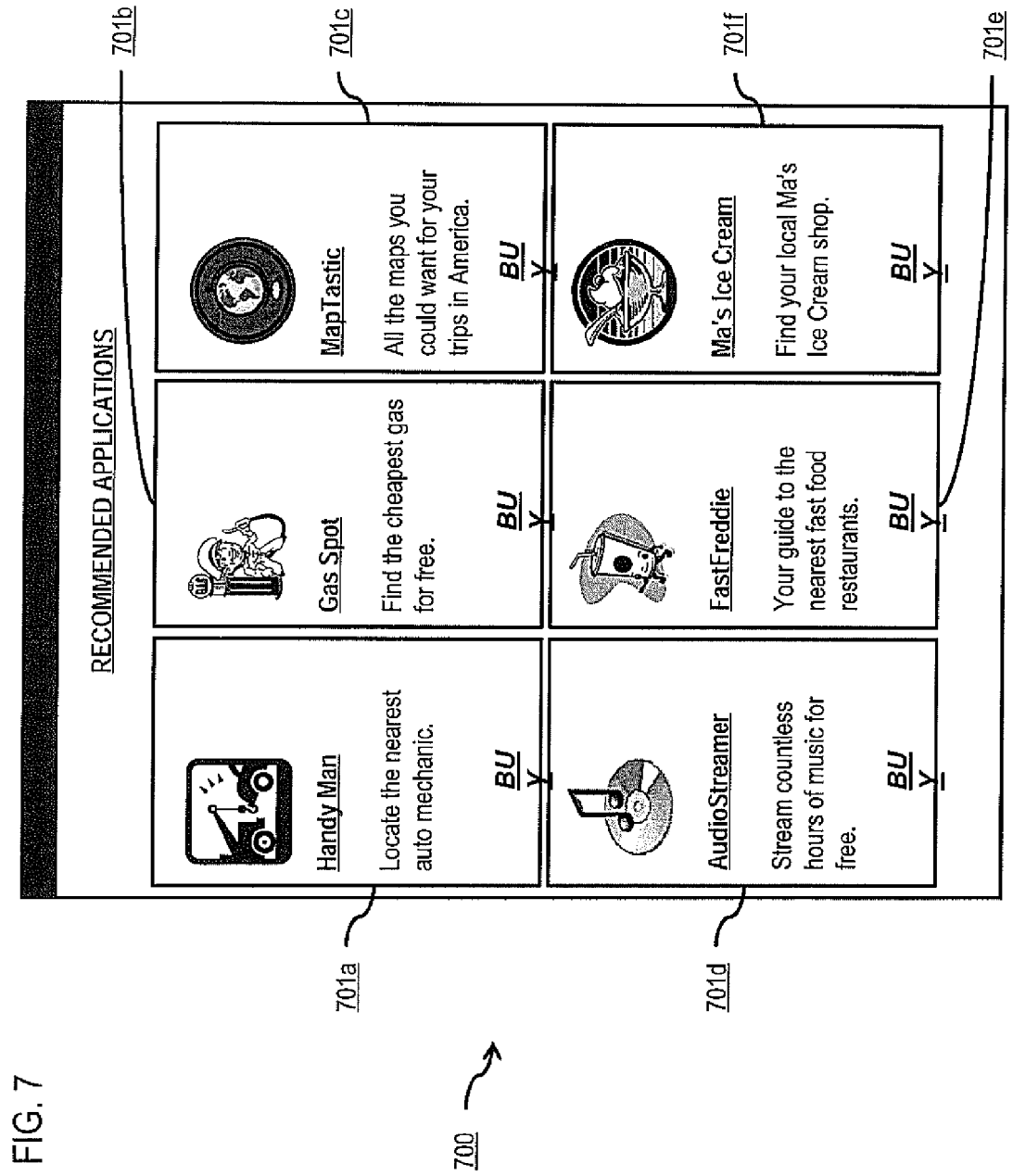
FIG. 7 is a diagram of a user interface utilized in the processes of FIGS. 3-5, according to one embodiment.

FIG. 7 is a diagram of a user interface 700 utilized in the processes of FIGS. 3-5, according to one embodiment. By way of example, the user interface 700 may be a user interface associated with a UE 101. The user of the UE 101 may be currently driving their car on a long distance trip across the United States. Based on an analysis of the context information of the user and one or more applications 111 associated with the user and/or the UE 101 of the user, the similarity may determine a context intent of, for example, long-distance driving. If the user navigates with the UE 101 to a service 109a and/or an application 111b that provides applications 111 for downloading and executing at the UE 101, the similarity platform 103 may interface with the service 109a and/or the application 111b to provide context-aware recommendations to the user based on context-aware similarities. For example, based on the latent context intent of long-distance driving, the service 109b and/or the application 111b may, by way of interfacing with the similarity platform 103, recommend applications 701a-701f that are associated with automobiles and/or driving, such as applications 701a and 701b for vehicle maintenance and re-fueling, respectively, or applications 701e and 701f for places to eat along the long car ride. Further, the similarity platform 103 may cause recommendations of applications 701c and 701d for determining the route for the trip and listening music during the trip, respectively. Thus, although the content of the applications 701a-701f may not be similar (e.g., vehicle maintenance is unrelated to fast food), the applications 701a-701f may be related based on a context-aware similarity determination and presented to the user.

The processes described herein for determining the context-aware similarity between applications may be advantageously implemented via software, hardware, firmware or a combination of software and/or firmware and/or hardware.

For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to determine the context-aware similarity between applications as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of determining the context-aware similarity between applications.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to determining the context-aware similarity between applications. The computer program code is a set of instructions or statements providing instructions for the operation of the processor and/or the computer system to perform specified functions. The cod; for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for determining the context-aware similarity between applications. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for determining the context-aware similarity between applications, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for determining the context-aware similarity between applications at the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

Figure 9:
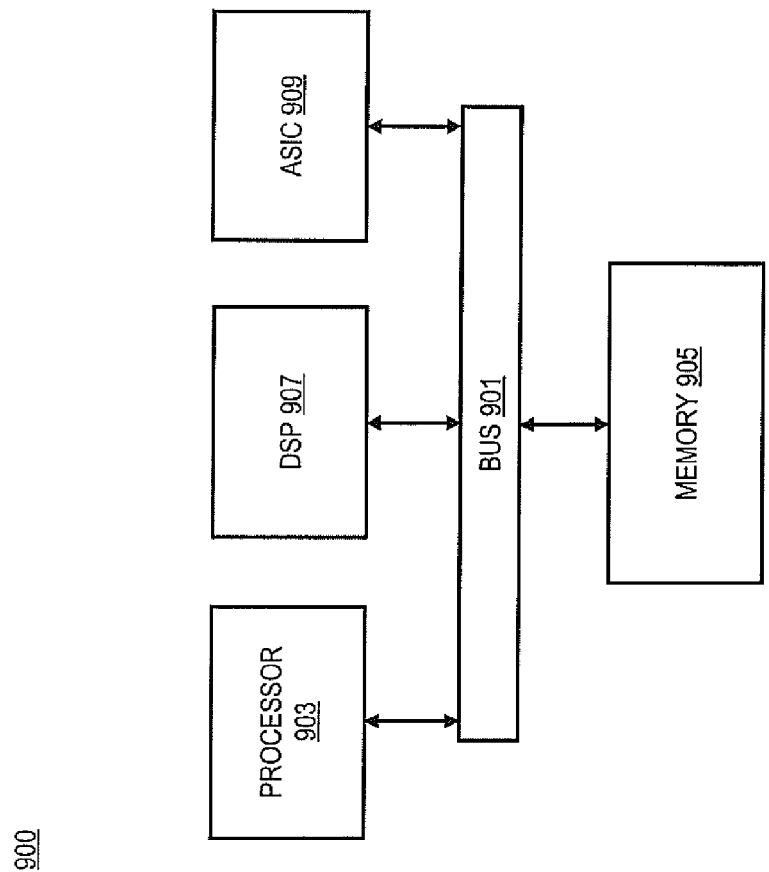
FIG. 9 is a diagram of a chip set that can be used to implement an embodiment of the invention.

FIG. 9 illustrates a chip set or chip 900 upon which an embodiment of the invention may be implemented. Chip set 900 is programmed to determine the context-aware similarity between applications as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of determining the context-aware similarity between applications.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to determine the context-aware similarity between applications. The memory 905 also stores the data associated with or generated by the execution of the inventive steps.

Figure 10:
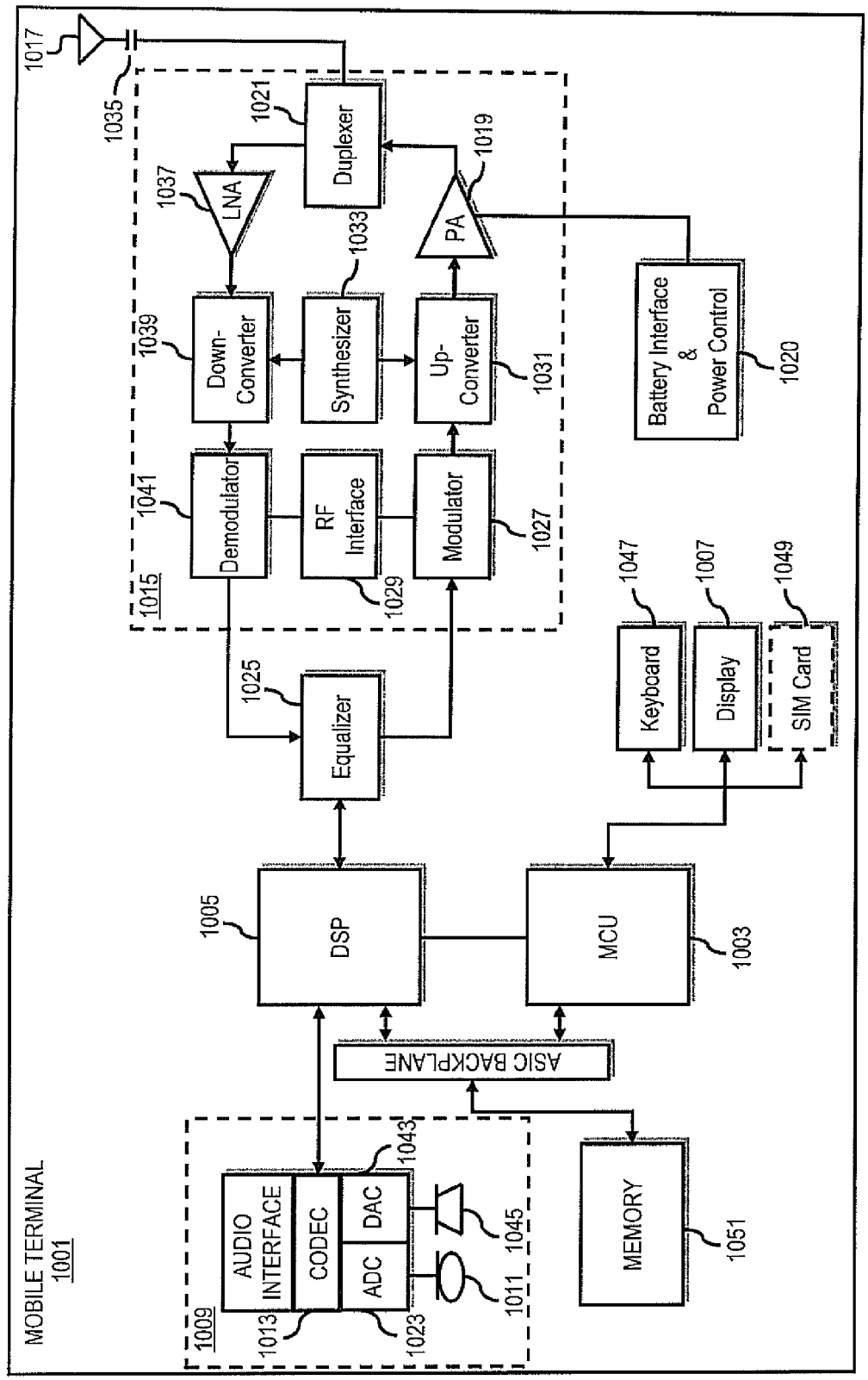
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of determining the context-aware similarity between applications. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of determining the context-aware similarity between applications. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to determine the context-aware similarity between applications. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method, comprising:
   processing, by at least one processor, context information associated with one or more of a plurality of software applications;
   determining, by the at least one processor, one or more contexts, in which the one or more of the plurality of software applications was executed, based on the processed context information;
   determining, by the at least one processor, one or more context intents of a user based on context-aware usage preferences relating to executing the one or more of the plurality of software applications by way of an interactive user interface of user equipment for the user,
   wherein the one or more context intents of the user includes a determination of whether the user is moving or stationary during a certain time of day; and
   mapping, by the at least one processor, the one or more of the plurality of software applications and one or more contexts with respect to the one or more context intents.

2. The method according to claim 1, further comprising:
   determining, by the at least one processor, one or more distributions of the plurality of software applications based on the mapping.

3. The method according to claim 2, further comprising:
   determining, by the at least one processor, a context-aware similarity, with respect to a given context, between a reference software application and at least one of the plurality of software applications based, at least in part, on the one or more distributions.

4. The method according to claim 3, further comprising:
   determining, by the at least one processor, the context-aware recommendation of the at least one software application based, at least in part, on the context-aware similarity as determined with respect to the given context.

5. The method according to claim 4, further comprising:
initiating, by the at least one processor, a presentation of the context-aware recommendation of the at least one software application on the interactive user interface for the user.

6. The method according to claim 3, wherein the reference software application and at least one of the plurality of software applications are within different software application categories.

7. An apparatus comprising:
at least one processor; and
at least one memory including computer program code for one or more programs, the at least one memory and the computer program code configured to, with the at least one processor, cause the apparatus to perform at least the following:
process, by at least one processor, context information associated with one or more of a plurality of software applications;
determine, by the at least one processor, one or more contexts, in which the one or more of the plurality of software applications was executed, based on the processed context information;
determine, by the at least one processor, one or more context intents of a user based on context-aware usage preferences relating to executing the one or more of the plurality of software applications by way of an interactive user interface of user equipment for the user,
wherein the one or more context intents of the user includes a determination of whether the user is moving or stationary during a certain time of day; and
map, by the at least one processor, the one or more of the plurality of software applications and one or more contexts with respect to the one or more context intents.

8. The apparatus of claim 7, wherein the apparatus is further configured to:
determine, by the at least one processor, one or more distributions of the plurality of software applications based on the mapping.

9. The apparatus according to claim 8, wherein the apparatus is further configured to:
determine, by the at least one processor, a context-aware similarity, with respect to a given context, between a reference software application and at least one of the plurality of software applications based, at least in part, on the one or more distributions.

10. The apparatus according to claim 9, wherein the apparatus is further configured to:
determine, by the at least one processor, the context-aware recommendation of the at least one software application based, at least in part, on the context-aware similarity as determined with respect to the given context.

11. The apparatus according to claim 10, wherein the apparatus is further configured to:
initiate, by the at least one processor, a presentation of the context-aware recommendation of the at least one software application on the interactive user interface for the user.

12. The apparatus according to claim 9, wherein the reference software application and at least one of the plurality of software applications are within different software application categories.

13. A non-transitory computer-readable storage medium carrying one or more sequences of one or more instructions which when executed by at least one processor, cause an apparatus to perform at least:
processing, by the at least one processor, context information associated with one or more of a plurality of software applications; and
determining, by the at least one processor, one or more contexts, in which the one or more of the plurality of software applications was executed, based on the processed context information;
determining, by the at least one processor, one or more context intents of a user based on context-aware usage preferences relating to executing the one or more of the plurality of software applications by way of an interactive user interface of user equipment for the user,
wherein the one or more context intents of the user includes a determination of whether the user is moving or stationary during a certain time of day; and
mapping, by the at least one processor, the one or more of the plurality of software applications and one or more contexts with respect to the one or more context intents.

14. The non-transitory computer-readable storage medium according to claim 13, wherein the apparatus further performs:
determining, by the at least one processor, one or more distributions of the plurality of software applications based on the mapping.

15. The non-transitory computer-readable storage medium according to claim 14, wherein the apparatus further performs:
determining, by the at least one processor, a context-aware similarity, with respect to a given context, between a reference software application and at least one of the plurality of software applications based, at least in part, on the one or more distributions.

16. The non-transitory computer-readable storage medium according to claim 15, wherein the apparatus further performs:
determining, by the at least one processor, the context-aware recommendation of the at least one software application based, at least in part, on the context-aware similarity as determined with respect to the given context.

17. The non-transitory computer-readable storage medium according to claim 16, wherein the apparatus further performs:
initiating, by the at least one processor, a presentation of the context-aware recommendation of the at least one software application on a user interface for the user.

18. The non-transitory computer-readable storage medium according to claim 15, wherein the reference software application and at least one of the plurality of software applications are within different software application categories.

* * * * *